Figure 4:
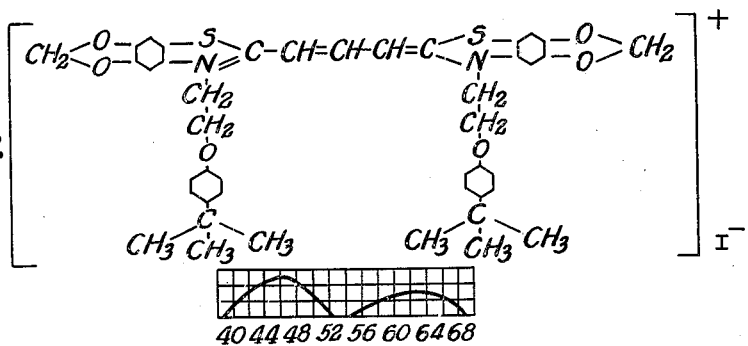

Sept. 6, 1949.    A. W. ANISH    2,481,464
PHOTOGRAPHIC EMULSIONS CONTAINING N-ARYLOXY-,
ARYLTHIO- AND ARYLSELENOALKYL CYANINE DYES
Filed Dec. 29, 1945    4 Sheets-Sheet 1
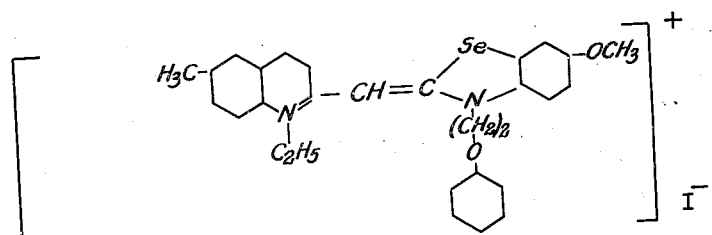
Fig.1.
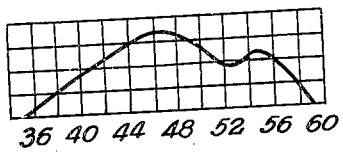
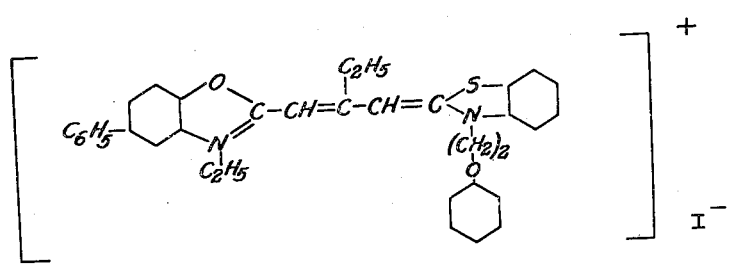
Fig.2.
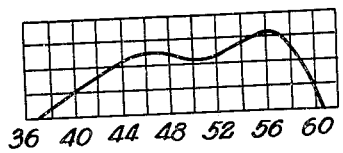
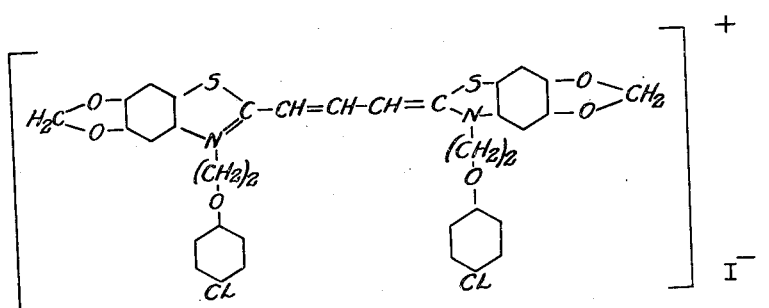
Fig.3.
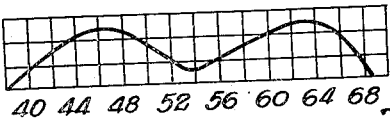
Inventor:
ALFRED W. ANISH,
by
Attorney Sept. 6, 1949.  A. W. ANISH  2,481,464
PHOTOGRAPHIC EMULSIONS CONTAINING N-ARYLOXY-,
ARYLTHIO- AND ARYLSELENOALKYL CYANINE DYES
Filed Dec. 29, 1945  4 Sheets-Sheet 2

Inventor:
ALFRED W. ANISH,
by
Attorney

Sept. 6, 1949.  A. W. ANISH  2,481,464
PHOTOGRAPHIC EMULSIONS CONTAINING N-ARYLOXY-,
ARYLTHIO- AND ARYLSELENOALKYL CYANINE DYES
Filed Dec. 29, 1945  4 Sheets-Sheet 3

Inventor:
ALFRED W. ANISH,
by
Attorney

Sept. 6, 1949.  A. W. ANISH  2,481,464
PHOTOGRAPHIC EMULSIONS CONTAINING N-ARYLOXY-,
ARYLTHIO- AND ARYLSELENOALKYL CYANINE DYES
Filed Dec. 29, 1945  4 Sheets-Sheet 4

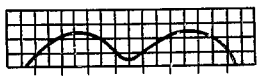

Inventor:
ALFRED W. ANISH,
by
Attorney

Patented Sept. 6, 1949

2,481,464

UNITED STATES PATENT OFFICE 2,481,464

PHOTOGRAPHIC EMULSIONS CONTAINING N-ARYLOXY-, ARYLTHIO- AND ARYL-SELENOALKYL CYANINE DYES

Alfred W. Anish, Vestal, N. Y., assignor to General Aniline & Film Corporation, New York, N. Y., a corporation of Delaware Application December 29, 1945, Serial No. 638,493

4 Claims. (Cl. 95—7)

This invention relates to new cyanine dyes and to photographic emulsions sensitized by such dyes.

It is well known that the type of group attached to the cyanine nitrogen atoms in cyanine dyes exert an influence on the properties of the dye. For example, it has been known for some time that where there is an alkyl group on the cyanine nitrogen, the maximum intensity of sensitization is reached with the ethyl or propyl group and that the sensitization decreases when the number of carbon atoms in the alkyl group is increased.

Other substitutions than the alkyl group have been proposed. For example, in U. S. P. 2,231,658, there are disclosed cyanine dyes having an oxygen-containing alkyl group devoid of aryl substituents such as, for instance, alkoxy alkyl, hydroxy alkyl, the halogen-containing and cyanogen-containing alkyl groups. The dyes proposed in this patent provide sensitizers for the red, far-red and infrared and increase the solubility of the dye which in turn minimizes residual dye stain following photographic development.

According to my invention, I have found that the introduction of aryloxyalkyl, arylthioalkyl and arylselenoalkyl groups on at east one of the two cyanine nitrogen atoms of certain cyanine dyes provides new dyes having highly desirable properties.

The cyanine dyes coming within the scope of my invention are those in which one of the heterocyclic nitrogen nuclei is selected from the group consisting of 5- and 6-membered heterocyclic nitrogen nuclei and the other is a 5-membered heterocyclic nitrogen nucleus.

The dyes comprising my invention may be represented by the following general formula:

I 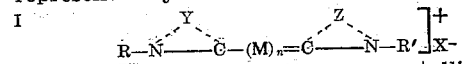

wherein Y represents the non-metallic atoms necessary to complete a heterocyclic nucleus of the 5- and 6-membered heterocyclic nuclei; Z represents the non-metallic atoms necessary to complete a 5-membered heterocyclic nucleus; M represents a methenyl chain; $n$ represents a positive odd integer such as 1, 3, 5, 7, 9, and 11; X an acid group; R and R′ alkyl, aralkyl, cycloaliphatic, at least one of the R's being a —(CH$_2$)$_m$—A— aryl group, wherein $m$ is a positive integer such as 2 or 3, A represents O, S, or Se, and aryl represents an aryl group of the benzene and naphthalene series. More particularly, the dyes may be represented by the following formulas:

II 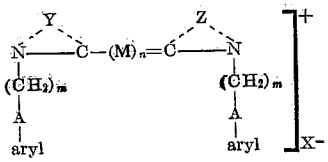

III

IV 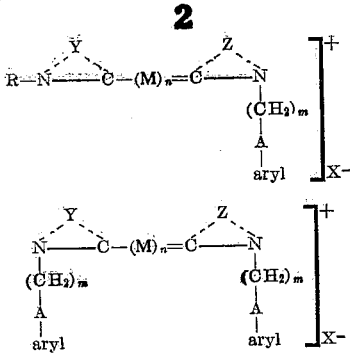

wherein the various symbols have the same significance as in Formula I.

More particularly, in the above formulas, Y, for example, represents the non-metallic atoms necessary to complete a heterocyclic nucleus as, for instance, a member of the oxazole series, e. g. benzoxazole and naphthoxazole; a member of the thiazole series, e. g. benzthiazole; a member of the thiazoline series, e. g. thiazoline; a member of the pyridine series, e. g. pyridine; a member of the quinoline series, e. g., benzoquinoline or quinoline; a member of the selenazole series, e. g. benzselenazole; a member of the selenazoline series, e. g. selenazoline, or a member of the indolenine series, e. g. 3,3-dimethyl indolenine.

More particularly, Z represents, for instance, the non-metallic atoms necessary to complete a 5-membered heterocyclic nucleus, such as of the thiazoline or selenazoline series, e. g. thiazoline or selenazoline; of the thiazole series, e. g. benzthiazole; of the oxazole series, e. g. benzoxazole; of the selenazole series, e. g. benzselenazole; of the indolenine series, e. g. 3,3-dimethyl indolenine.

More particularly, $n$ is a positive odd integer, for instance, not greater than 11; $m$ is a positive integer as, for example, 2 or 3, X is an acid group as, for example, chlorine, bromine, iodine, methosulfate, para-toluene, sulfonate, perchlorate, etc. Aryl may be benzene or naphthalene or chlorobenzene or phenyl substituted, for example, by methyl, methoxy or a branched aliphatic chain, as di-isopropyl, di-isobutyl, tertiary-butyl or by cyclohexyl; R and R′ may be, for example, methyl, ethyl, isopropyl, allyl, β-ethoxyethyl, cyclohexyl, phenyl, etc.

My new dyes have many advantages and novel properties. For example, it is often necessary to increase the molecular "bulk" of a dye for purposes of non-diffusion. However, such increase in molecular size of the cyanine dyes by means of increasing the molecular size of the alkyl or aralkyl groups in the cyanine nitrogen atoms of heretofore known cyanine dyes diminishes the overall power of sensitization. Thus, substituting the cyanine nitrogen aralkyl group in the aryl portion by a di-isopropyl or tertiary butyl or phenyl group of a cyanine dye decreases the sensitization power of the dye. A similar depression in power of sensitization occurs when a long chain alkyl group is introduced directly to the cyanine nitrogen.

On the other hand, the dyes of the present invention do not lose their power of sensitization nor are they materially affected in speed when increasing the "bulk" of the dye by such substitutions in the aryl portion of the molecule. Thus, alkyl, branched alkyl groups, phenyl, cyclohexyl and halogen, such as bromine and chlorine groups may be substituted in the aryl portion of the dye molecule without materially affecting the speed or power of sensitization of the dye.

Another advantage of the dyes of the present invention is that they do not "wander" or diffuse when they are utilized in multilayer photographic coatings such as are employed in color photography. Nor are they displaced from the layer by the color former that may be present. This and other unique properties of my new dyes make them highly valuable in the photographic arts.

My new dyes can be readily prepared from cyclammonium quaternary salts, the preparation of which will be presently described. In general, these salts may be referred to as cyclammonium aryloxyalkyl, arylthioalkyl and arylselenoalkyl quaternary salts. They can, in general, be prepared by reacting a heterocyclic nitrogen base with an aryloxyalkyl, arylthioalkyl, arylselenoalkyl toluenesulfonate. The preparation of such toluenesulfonates is generally effected by reacting p-toluene sulfonyl chloride in the presence of a base such as caustic alkali, or pyridine with an aryloxyalkyl alcohol, arylthioalkyl alcohol or arylselenoalkyl alcohol. The method of preparing such p-toluenesulfonates is illustrated by the following examples:

EXAMPLE 1

*p-(t-butyl) phenoxy ethyl p-toluenesulfonate*

19.4 grams (0.1 mol) of β-(p-tertiary butyl phenoxy) ethyl alcohol were dissolved in 32 grams of pyridine and 20.9 grams (0.11 mol) of p-toluene sulfonyl chloride were added while stirring. The temperature was kept below 5° C. while adding the latter reagent and the stirring was continued for an additional 3 hours at a temperature under 20° C. After standing for 12 hours, the reaction solution was poured into 60 cc. of concentrated hydrochloric acid diluted with 140 cc. of water. The white solid was filtered off, washed with 2 N caustic alkali solution and finally with cold water. After drying, the solid was recrystallized from petroleum ether B. P. 90°–100° C. The product had a melting point of 92° C.

In a similar manner, p-di-isobutyl phenoxyethyl p-toluenesulfonate was prepared and had a melting point of 86° C. Similarly, there was prepared p-methyl phenoxyethyl p-toluenesulfonate, which melted at 55° C., p-cyclohexyl phenoxyethyl p-toluenesulfonate which melted at 113° C., p-chlorophenoxyethyl p-toluenesulfonate which melted at 70° C., and p-phenyl phenoxyethyl p-toluenesulfonate which melted at 152° C.

The aryl thioalkyl and arylselenoalkyl p-toluenesulfonates are prepared by reacting thio- or seleno-phenol or substituted thiophenol or selenophenol with chlorohydrin in the presence of sodium alcoholate and then reacting the aryl thioalkyl or arylselenoalkyl alcohol with p-toluene sulfonyl chloride in a similar manner as illustrated in Example 1.

Illustrative of the method of preparing the cyclammonium aryloxyalkyl, arylthioalkyl and arylselenoalkyl quaternary salts are the following examples:

EXAMPLE 2

*2-methylbenzthiazole phenoxyethyl p-toluenesulfonate*

Equal parts by weight of 2-methylbenzothiazole and phenoxyethyl p-toluenesulfonate were heated together in an oil bath at 130–140° C. for 16 hours. A mixture of dry acetone and dry ethyl ether was added to the cooled reaction mixture. The crude thick oil solidified on rubbing and was used in the preparation of dyes.

EXAMPLE 3

*2-methyl-5,6-methylenedioxy benzthiazole phenylthioethyl p-toluenesulfonate*

Equal parts by weight of phenylthioethyl p-toluene-sulfonate and 2-methyl-5,6-methylenedioxy benzthiazole were heated 12 hours at 130–140° and then washed with a mixture of dry ether and dry acetone. The residue was used without further purification for the preparation of dyes.

In a similar manner to that illustrated, 2-methylbenzoxazole, 2-methyl-6-methoxy-benzselenazole, 2-methyl-6,7-benzobenzthiazole, 2-methyl-4-phenylthiazole, 2-methyl-4-phenyloxazole, 2-methyl-4-phenylselenazole, 2-methyl thiazoline, 2-methylmercapto benzthiazole, 2-phenylmercapto benzthiazole, for instance, can be converted into the aryloxyalkyl, arylthioalkyl and arylselenoalkyl quaternary salts. By using p-di-isobutyl phenoxyethyl p-toluenesulfonate, p-methyl phenoxyethyl p-toluenesulfonate, p-cyclohexyl phenoxyethyl p-toluenesulfonate, p-chlorophenoxyethyl p-toluenesulfonate, p-phenyl phenoxyethyl p-toluenesulfonate and the corresponding sulfur and seleno compounds, the corresponding aryloxyalkyl, arylthioalkyl and arylselenoalkyl quaternary salts which are substituted in the aryl nucleus are obtained.

The toluene sulfonate quaternary salts, if desired, can readily be converted into the aryloxyalkyl, arylthioalkyl, and arylselenoalkyl halides or perchlorates, by treating solutions of the aforementioned toluenesulfonates with solutions of soluble halides or perchlorates, such as, potassium iodide or bromide or sodium perchlorate.

The intermediates described may be readily employed in preparing simple cyanine, carbocyanine, dicarbocyanine, tricarbocyanine, tetra and pentacarbocyanine dyes, hemi-cyanines, styryl dyes, and dye bases.

The following examples will serve to illustrate the various methods of obtaining the new cyanine dyes but are not intended to limit the invention.

EXAMPLE 4

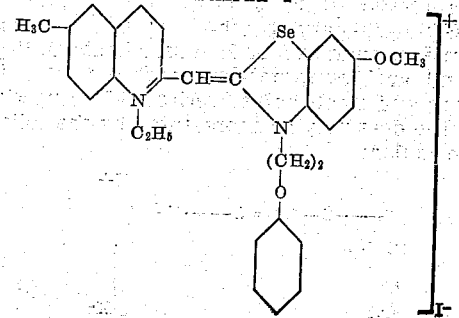

2.5 grams of 2-methyl-6-methoxy benzselenazole phenoxy-ethyl p-toluenesulfonate and 1.7 grams 2-methylmercapto-6-methyl quinoline ethiodide were dissolved in 100.0 cc. of absolute ethyl alcohol and 2.0 cc. of triethylamine added. The mixture was refluxed for 60 minutes. The reaction product was filtered while still hot and the crystals which separated on cooling were recrystallized from methyl alcohol. Instead of employing the 2-methylmercapto-6-methyl quinoline ethiodide, the corresponding 2-iodo intermediate may be employed to prepare the dye.

When coated in combination with chain substituted panchromatic dyes the speed of the resulting emulsion was greater than of either dye coated alone. The dye from Example 4 acts as a dye-supersensitizer. For example, 25.0 milligrams of dye from Example 4 and 40 milligrams 3,3'-diethyl-9-methyl benzthiocarbocyanine iodide per kilogram of emulsion were coated in a 4-5% silver halide gelatin emulsion containing silver bromide and silver iodide. The speed of the resulting emulsion was at least one stop faster under a minus plus filter than either dye used alone. The dye sensitizes with a maximum at 550 mu to 580 mu.

EXAMPLE 5

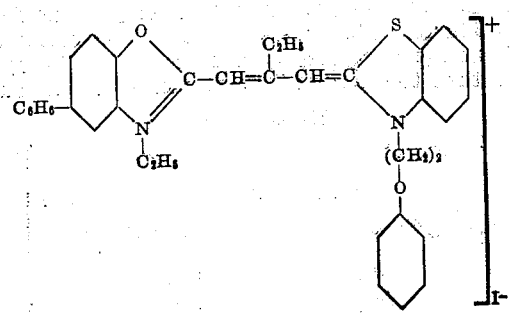

2.0 grams each of 2-(β-anilino-β-ethyl vinyl) 6-phenyl benzoxazole ethiodide and 2-methyl benzthiazole phenoxyethyl p-toluenesulfonate were refluxed 2 hours in 10 cc. of pyridine. The mixture was cooled and diluted with 5.0 cc. water containing 1.0 gram of potassium iodide. The dye crystals which separated on standing were recrystallized twice from ethyl alcohol. The sensitivity of the dye extends to 600 mu with a maximum at 570 mu.

EXAMPLE 6

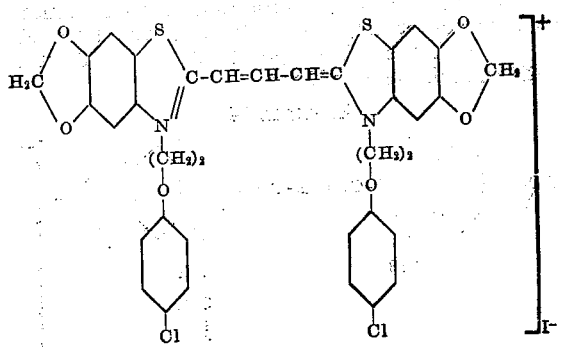

1.8 grams of 2-methyl-5,6-methylenedioxy benzthiazole p-chloro phenoxyethyl p-toluenesulfonate and 3.0 cc. of ethyl o-formate in 15.0 cc. of pyridine were refluxed for 3 hours. The reaction mixture was diluted with an equal volume of 95% ethyl alcohol and let stand. The dye which crystallized out was recrystallized from methyl alcohol. The dye was converted to the iodide by redissolving the purified dye in 95% ethyl alcohol and adding 10% potassium iodide solution. The sensitivity of the dye extends to 680 mu with a maximum at 640 mu.

EXAMPLE 7

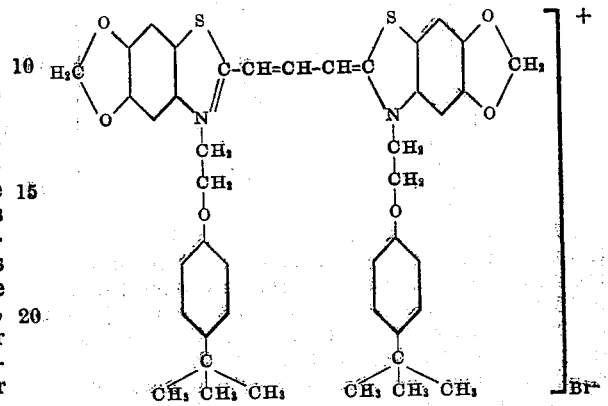

1.4 grams 2-methyl-5,6-methylenedioxy benzthiazole p-(t-butyl) phenoxyethyl p-toluenesulfonate and 3.0 cc. of ethyl o-formate were mixed in 15.0 cc. of pyridine, and heated to reflux for 3 hours. The dye solution was diluted with 10.0 cc. of ethanol and the dye precipitated as the bromide by adding a potassium bromide solution. The green dye crystals which separated were recrystallized from ethanol. When incorporated into a silver bromide-silver iodide emulsion at 40 milligrams per kilogram of emulsion, the dye had a strong sensitivity and did not diffuse in multilayer coatings. The dye sensitized to 680 mu with a maximum at 640 mu.

EXAMPLE 8

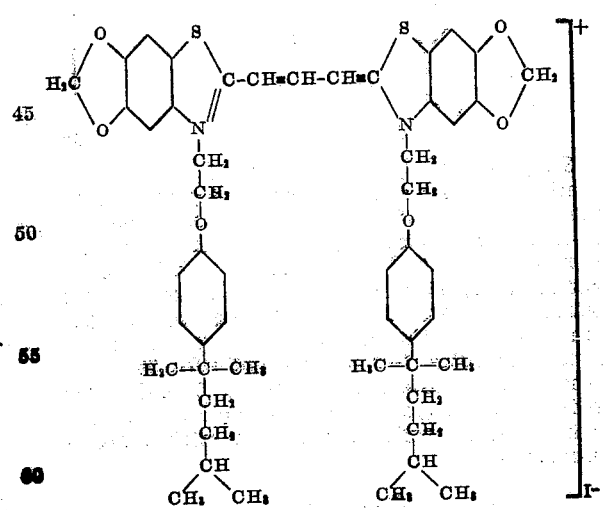

1.1 grams of 2-methyl-5,6-methylenedioxybenzthiazole-(p-di-isobutyl) phenoxyethyl p-toluenesulfonate and 3.0 cc. of ethyl o-formate were mixed in 15.0 cc. of pyridine and heated 2½-3 hours. The pyridine solution was diluted with an equal volume of ethanol and precipitated as the iodide with potassium iodide.

When incorporated into a silver bromide-silver iodide gelatin emulsion in a concentration of 40 milligrams per kilogram of emulsion, the dye had a strong sensitivity with a maximum at 640 mu and sensitivity to 680 mu. The dye did not diffuse in multilayer coatings.

Example 9

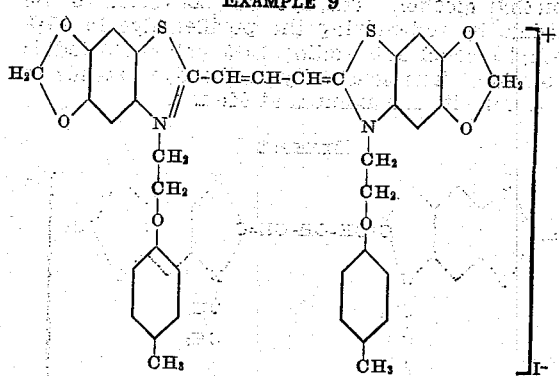

1.7 grams of 2-methyl-5,6-methylenedioxybenzthiazole (p-methyl) phenoxyethyl p-toluenesulfonate and 3.0 cc. of ethyl o-formate were mixed in 15.0 cc. of pyridine and heated to reflux 2½–3 hours. The dye was recovered as the bromide in a manner similar to that described for Example 8. The dye sensitized with a maximum at 640 mu to 680 mu.

Example 10

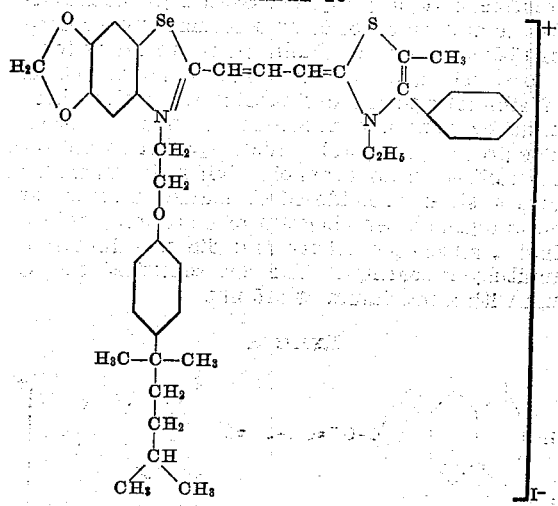

3.3 grams of 2-(β-anilino vinyl) 4-phenyl-5-methyl thiazole ethiodide and 6.3 grams of 2-methyl-5,6-methylene-dioxy benzselenazole-(p-di-isobutyl) phenoxyethyl p-toluene-sulfonate were mixed in 25.0 cc. of pyridine and 5.0 cc. of acetic anhydride added. The mixture was warmed on a steam bath and 5.0 cc. of triethylamine added. The mixture was brought to reflux 30 minutes, then diluted out with 30 cc. of ethanol and allowed to crystallize. The dye was redissolved in alcohol and precipitated as the iodide. The sensitized to 670 mu with a maximum at 630 mu.

Example 11

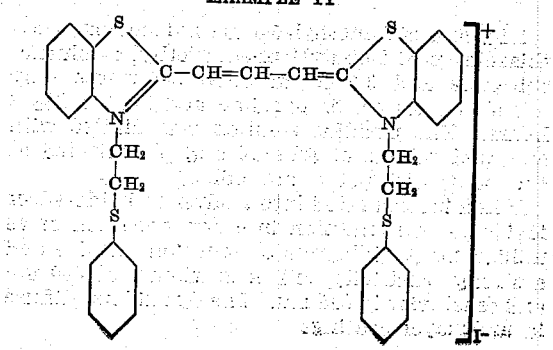

2.0 grams of 2-methyl benzthiazole phenylthioethly p-toluenesulfonate were mixed with 3.0 cc. of ethyl o-formate in 20.0 cc. of pyridine and refluxed 2 hours. The dye which separated on standing was filtered off and recrystallized from methyl alcohol. The dye was redissolved in alcohol and precipitated as the iodide. The dye sensitized to 680 mu with a maximum at 640 mu.

Example 12

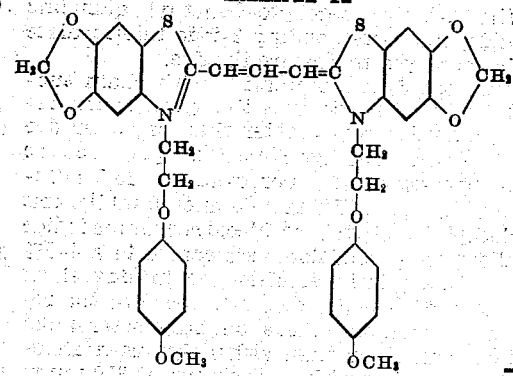

2.0 grams of 2-methyl-5,6-methylenedioxybenzthiazole-(p-methoxy) phenoxyethyl p-toluenesulfonate were mixed with 3.0 cc. of ethyl o-formate and refluxed in 20.0 cc. of pyridine for 2½–3 hours. The dye was isolated as the bromide salt and purified just as in Example 8. The dye sensitized to 680 mu with a maximum at 640 mu.

Example 13

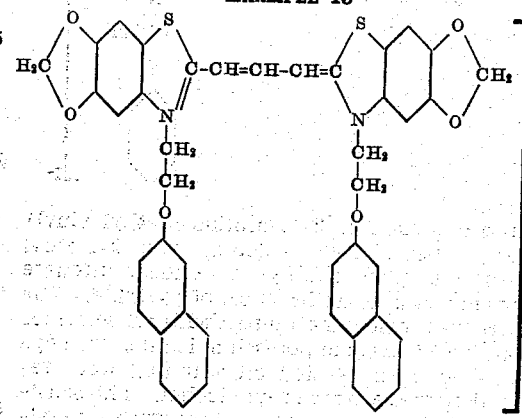

2.3 grams of 2-methyl-5,6-methylenedioxybenzthiazole-(β-naphthoxy) ethyl p-toluenesulfonate were reacted with 3.0 cc. of ethyl o-formate in 20 cc. of pyridine in a manner similar to that for Example 8. The dye was isolated as the chloride. The dye sensitized to 680 mu with a maximum at 640 mu.

Example 14

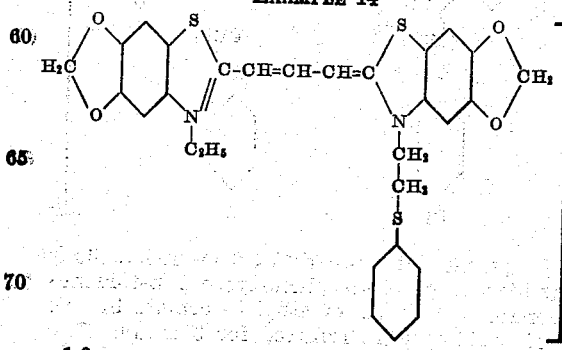

1.0 gram each of 2-(β-acetanilido vinyl)-5,6-methylenedioxybenzthiazole ethiodide and 2-methyl-5,6-methylenedioxybenzthiazole phenylthioethyl p-toluenesulfonate were dissolved in 15.0 cc. of pyridine and reacted in the presence of 1.0 cc. of thiethylamine. The dye was recovered and purified in a manner similar to that of Example 8. The dye sensitized to 680 mu with a maximum at 640 mu.

EXAMPLE 15

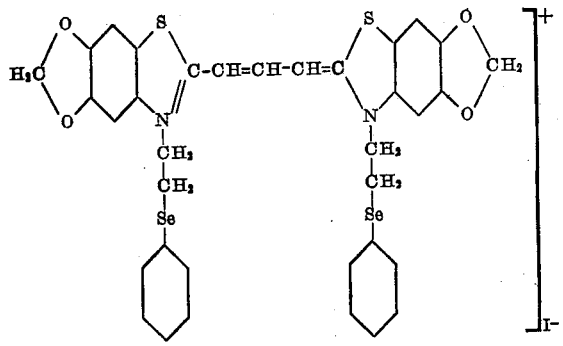

2.3 grams of 2-methyl-5,6-methylenedioxybenzthiazole phenylselenoethyl p - toluenesulfonate and 5.0 cc. of ethyl o-formate were mixed in 25.0 cc. of pyridine and heated for 2½-3 hours to reflux. The dye was redissolved in methanol and reprecipitated as the iodide. The dye sensitized to 680 mu with a maximum at 640 mu.

EXAMPLE 16

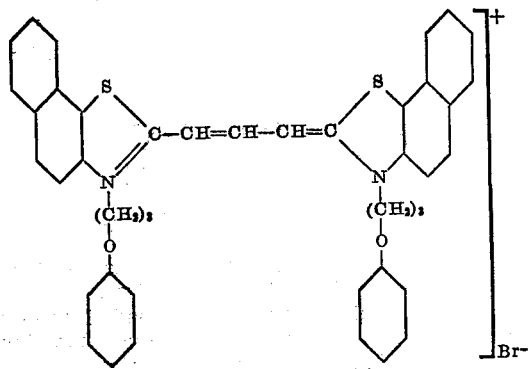

2.0 grams of 2-methyl-6.7-benzobenzthiazole phenoxypropyl p-toluenesulfonate and 3.0 cc. of ethyl o-formate were mixed in 20.0 cc. of pyridine and heated to reflux for 3 hours. The dye which separated on cooling was filtered off and recrystallized from ethyl alcohol. After precipitation as the bromide, the dye was recrystallized from methyl alcohol. The dye sensitized with a maximum at 640 mu and extended the sensitivity to 690 mu.

The diagrammatic spectrograms constituting the accompanying drawing illustrate the regions of the spectrum to which the various N-aryloxy-, arylthio- and arylselenoalkyl dyes disclosed herein will sensitize a gelatino silver-halide emulsion and the extent of the sensitization at various wavelengths. The thirteen figures of this drawing illustrate the sensitizing properties of the dyes in silver-halide emulsions in accordance with the present invention.

Figure 5:
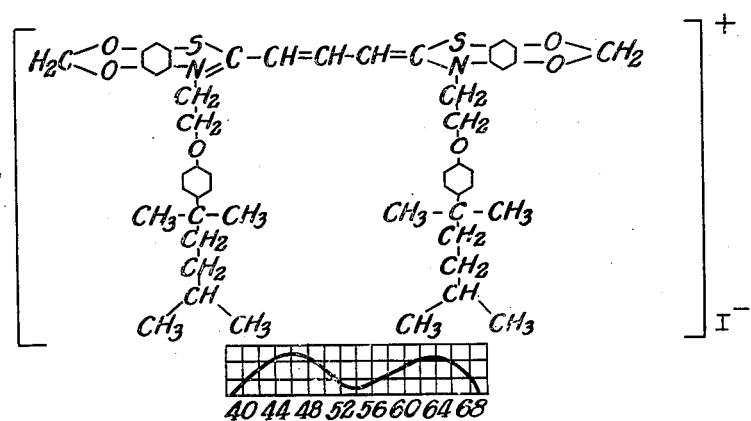
Figure 6:
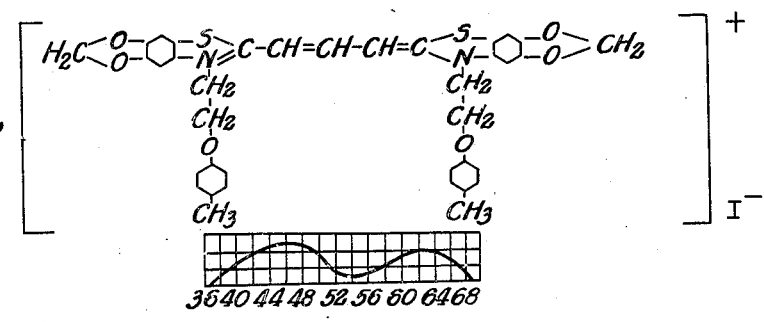
Figure 7:
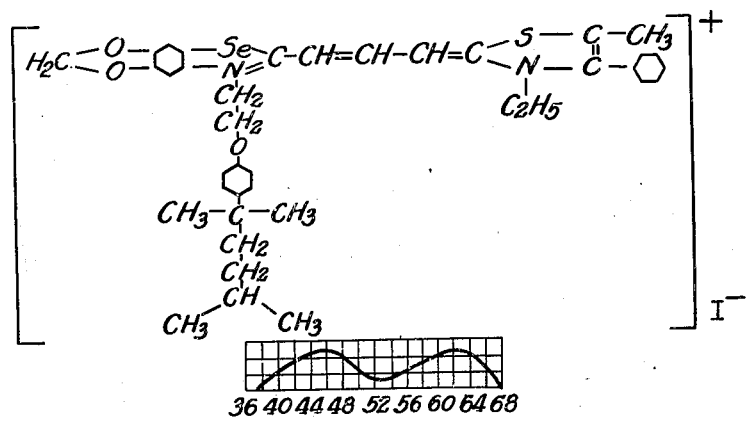
Figure 8:
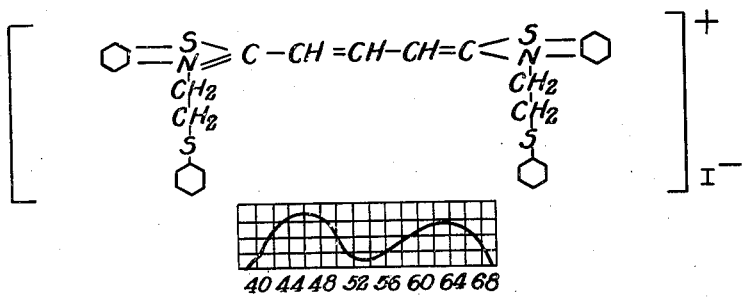
Figure 9:
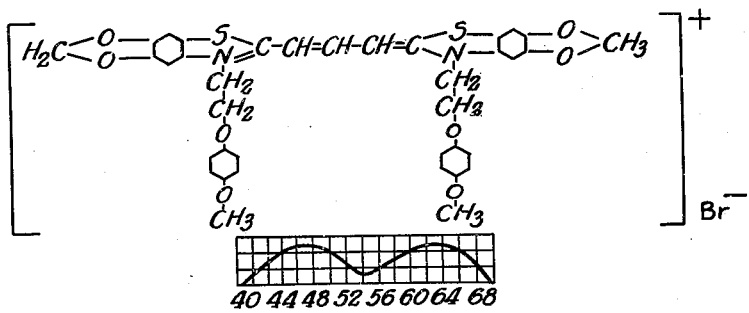
Figure 10:
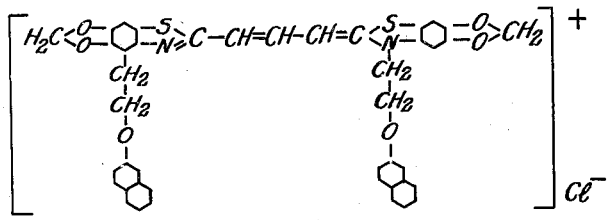
Figure 11:
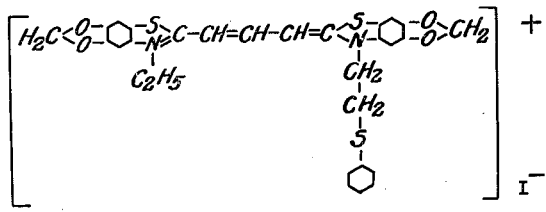
Figure 12:
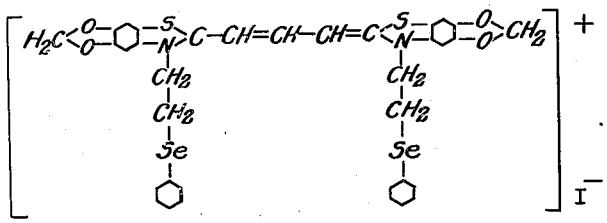
Figure 13:
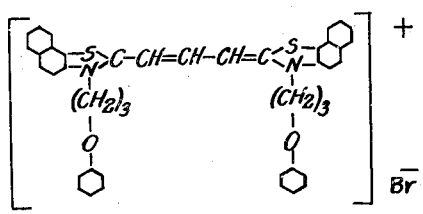

Figs. 1 to 13 inclusive illustrate the sensitizing properties of the dyes of Examples 4 to 16 inclusive.

The dicarbocyanine dyes containing aryloxyalkyl, arylthioalkyl, arylselenoalkyl groups on at least one of the cyanine nitrogen atoms can be prepared by condensing (1) a cyclammonium quaternary salt having one of the aforementioned groups on the nitrogen atom and containing a reactive methyl group with (2) the same or a different cyclammonium quaternary salt containing in a reactive position a 4-acetanilidobutadienyl group. Or, the compound (1) may contain the 4-acetanilidobutadienyl group in a reactive position instead of a methyl group and compound (2) a methyl group in a reactive position instead of the 4-acetanilidobutadienyl group.

The tricarbocyanines can be prepared in a similar manner, except that compound (1) or (2) carries in a reactive position the acetanilido hexatrienyl

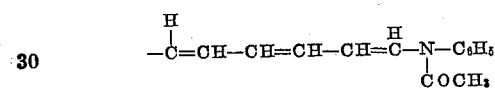

group, the other compound having a reactive methyl group.

Compounds containing the 4-acetanilidobutadienyl group in a reactive position and having an aryloxyalkyl, arylthioalkyl, or arylselenoalkyl group in the nitrogen atom can be prepared by condensing the corresponding cyclammonium quaternary salt having a methyl group in a reactive position with β-anilinoacrolein anil hydrochloride, in the presence of acetic anhydride. When the condensation is carried out with glutaconic aldehyde dianilide hydrochloride, the corresponding cyclammonium quaternary salt having an acetanilido hexatrienyl

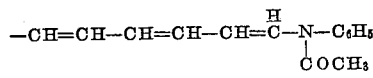

group in a reactive position is obtained.

The following examples will serve to illustrate the preparation of dicarbocyanine and tricarbocyanine dyes.

EXAMPLE 17

Equimolecular amounts of 2-(4-acetanilidobutadienyl) - 5,6 - methylenedioxy benzthiazole ethiodide and 2-methyl-5,6-methylenedioxybenzthiazole phenylthioethyl p-toluenesulfonate were condensed following the same procedure as Example 14. A dye was recovered having the following formula:

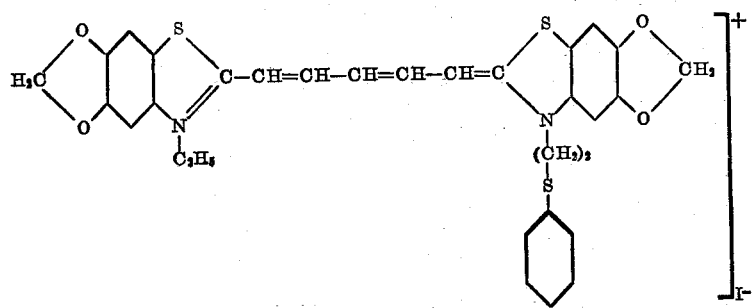

Example 18

When equimolecular amounts of 2-(6-acetanilidohexatrienyl)-5,6-methylenedioxybenzthiazole ethiodide and 2-methyl-5,6-methylenedioxybenzthiazole phenyloxyethyl p-toluenesulfonate are condensed following the procedure of Example 14, a tricarbocyanine dye was recovered having the following formula:

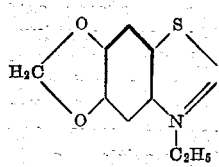 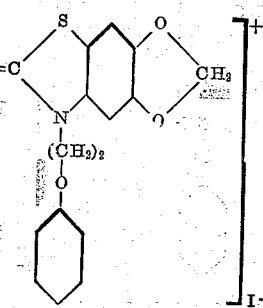

As condensing agents for preparing the new dyes, in addition to the pyridine and triethylamine mentioned in the above examples, any other suitable condensing agents may be utilized, such as dimethyl pyridine, ethyl pyridine, ethyl methyl pyridine, tributylamine, triethanolamine, sodium or potassium carbonate, etc. In general, the amount of condensing agent utilized may vary within wide limits, e. g. from 1 to 25 mols. Concentrations ranging from about 1 mol to about 15 mols are preferable. The condensing agents may also serve as diluents, but other diluents, such as, methyl, ethyl, n-propyl and iso-propyl alcohols are advantageously employed in the condensation reactions.

In general, the cyclammonium quaternary salts are utilized in equimolecular amounts although greater amounts of either may be employed. Heating facilitates the reaction and the reaction is carried out readily at refluxing temperatures.

In the above examples where ethyl orthoformate is employed, other esters of orthoformic acid may be utilized instead. There may be also employed in the above examples ethyl orthoacetate, ethyl orthopropionate and ethyl orthobenzoate instead of ethyl orthoformate. In such cases, the central carbon atom of the trimethenyl chain of the dye will be substituted by an ethyl, propyl and phenyl group, respectively. Instead of forming the dye by use of the toluene sulfonate cyclammonium quaternary salts and then converting the resulting dye salt to the chlorine, bromine, iodine or perchlorate dye salt, as in the above examples, the aryloxyalkyl, arylthioalkyl and arylselenoalkyl toluenesulfonate quaternary salts may be converted into the halide and perchlorate salts as indicated above and these employed in the condensation reactions to form the dyes.

In the preparation of photographic emulsions sensitized with my new dyes, the dyes may be dissolved in methyl or ethyl alcohol and a volume of this solution containing from 5 to 50 milligrams of the dye added to a kilogram of emulsion. The emulsion is any of the usually employed silver halide emulsions, as for example, the silver chloride and silver bromide type with gelatin as the carrier, although any other carriers may replace the gelatin such as cellulose derivatives or resins. The solution of the dye is added to the emulsion with stirring until the dye is thoroughly incorporated therein.

If desired, the dye may be incorporated by other methods. Thus, the photographic emulsion coated on a suitable support, as a film or plate, may be bathed with a solution of the dye in an appropriate solvent. However, the aforementioned method is the preferred one.

I claim:

1. A photographic gelatino silver-halide emulsion which contains a dye selected from the group consisting of dyes of the general formulae:

$$\left[ N{-}(CH{=}CH)_{m-1}{-}C{-}CH{=}(CH{-}CH)_{n-1}{=}C \begin{matrix} Z \\ \\ N \\ R_1 \end{matrix} \right]^+ X^-$$

and $$\left[ \begin{matrix} Z \\ \\ N \\ R \end{matrix} C{-}CH{=}\overset{C_2H_5}{C}{-}CH{=}C \begin{matrix} Z \\ \\ N \\ R_1 \end{matrix} \right]^+ X^-$$

wherein R represents a member selected from the class consisting of alkyl, aralkyl, aryloxyalkyl, arylthioalkyl and arylselenoalkyl groups, $R_1$ represents a member selected from the class consisting of aryloxyalkyl, arylthioalkyl and arylselenoalkyl groups, m represents a positive integer of from 1 to 2, n represents a positive integer of from 1 to 4, X represents an acid radicle, Y represents the atoms necessary to complete a member selected from the class consisting of 5-membered and 6-membered heterocyclic nitrogenous ring system and Z represents the atoms necessary to complete a 5-membered heterocyclic nitrogenous ring system.

2. A photographic gelatino-silver-halide emulsion containing the following dye:

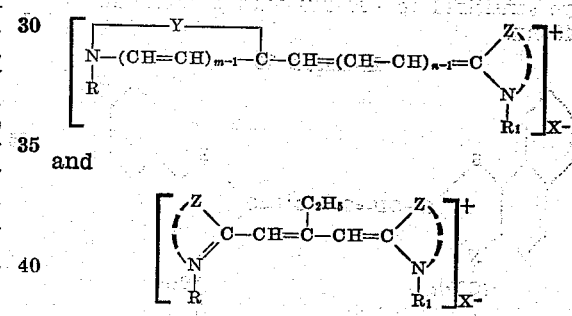

3. A photographic gelatino-silver-halide emulsion containing the following dye:

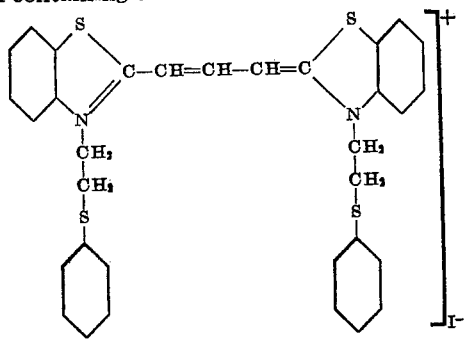

4. A photographic gelatino-silver-halide emulsion containing the following dye:

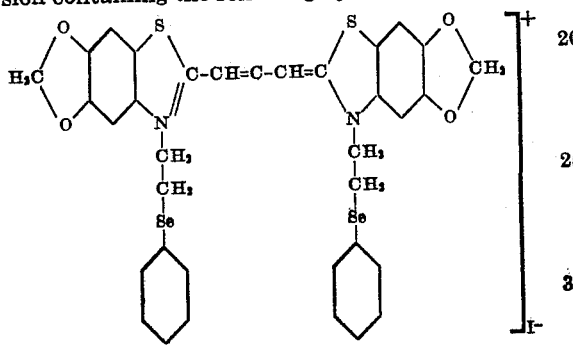

ALFRED W. ANISH.

REFERENCES CITED

The following references are of record in the file of this patent:

UNITED STATES PATENTS

| Number | Name | Date |
| --- | --- | --- |
| 2,075,153 | Wilmanns | Mar. 30, 1937 |
| 2,213,238 | Brooker et al. | Sept. 3, 1940 |
| 2,213,995 | Riester et al. | Sept. 10, 1940 |
| 2,231,658 | Brooker et al. | Feb. 11, 1941 |
| 2,231,659 | Brooker | Feb. 11, 1941 |
| 2,233,511 | Brooker et al. | Mar. 4, 1941 |
| 2,235,027 | Kumetat et al. | Mar. 18, 1941 |
| 2,238,231 | Riester et al. | Apr. 15, 1941 |
| 2,256,163 | Kumetat et al. | Sept. 16, 1941 |
| 2,289,300 | Wilmanns et al. | July 7, 1942 |
| 2,354,524 | Kumetat et al. | July 25, 1944 |
| 2,398,999 | Brooker et al. | Apr. 23, 1946 |

OTHER REFERENCES

Chemical Abstracts, 19: 530; abstract of Proc. Roy. Soc. (London) 96 B. 317–333 (1924).

Chemical Abstracts 16: 3101; abstract of Brit. Med. Journal, 1922 I, 514–515.